United States Patent
de La Chapelle et al.

(10) Patent No.: US 7,643,441 B2
(45) Date of Patent: Jan. 5, 2010

(54) SYSTEM AND METHOD FOR ADAPTIVE INFORMATION RATE COMMUNICATION

(75) Inventors: Michael de La Chapelle, Bellevue, WA (US); Christopher J. McLain, Palo Alto, CA (US); Joseph W. Niesen, Yorba Linda, CA (US); David S. Parkman, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 554 days.

(21) Appl. No.: 11/378,563

(22) Filed: Mar. 17, 2006

(65) Prior Publication Data

US 2007/0217355 A1 Sep. 20, 2007

(51) Int. Cl.
*H04B 7/185* (2006.01)
(52) U.S. Cl. ............................ 370/316; 725/63; 725/73; 455/13.4; 455/522
(58) Field of Classification Search .................. 370/347, 370/274; 455/13.4, 522
See application file for complete search history.

(56) References Cited

U.S. PATENT DOCUMENTS

| | | | |
|---|---|---|---|
| 5,103,459 A | 4/1992 | Gilhousen et al. | |
| 5,751,761 A | 5/1998 | Gilhousen | |
| 6,163,524 A | 12/2000 | Magnusson et al. | |
| 6,700,882 B1* | 3/2004 | Lindoff et al. | 370/337 |
| 2002/0018527 A1 | 2/2002 | Vanderaar et al. | |
| 2002/0058478 A1* | 5/2002 | de La Chapelle et al. | 455/13.4 |
| 2002/0108116 A1* | 8/2002 | Dillon | 725/63 |

OTHER PUBLICATIONS

Adachi/Sawahashi/Suda; IEEE Communications Magazine, "Wideband DS-CDMA for Next-Generation Mobile Communications Systems"; Sep. 1998; p. 56-69.

Dinan/Jabbari; IEEE Communications Magazine, "Spreading Codes for Direct Sequence CDMA and Wideband CDMA Cellular Networks"; Sep. 1998; p. 48-54; See abstracts at http://citeseer.ist.psu.edu/context/16753/o.

Ojanpera/Prasad; IEEE Communications Magazine, "An Overview of Air Interface Multiple Access for IMT-2000/UMTS"; Sep. 1998; p. 82-95.

* cited by examiner

*Primary Examiner*—Rafael Pérez-Gutiérrez
*Assistant Examiner*—Marcos Batista
(74) *Attorney, Agent, or Firm*—Harness, Dickey & Pierce, P.L.C.

(57) ABSTRACT

A satellite communications method for communicating information from a base station, via a satellite, to one or more user terminals via a single channel of a forward link.

26 Claims, 9 Drawing Sheets

| m | Ri (Mbps) | Gp (dB) |
|---|---|---|
| 2 | 8.100000 | 3.0 |
| 3 | 5.400000 | 4.8 |
| 4 | 4.050000 | 6.0 |
| 5 | 3.240000 | 7.0 |
| 6 | 2.700000 | 7.8 |
| 8 | 2.025000 | 9.0 |
| 9 | 1.800000 | 9.5 |
| 10 | 1.620000 | 10.0 |
| 12 | 1.350000 | 10.8 |
| 15 | 1.080000 | 11.8 |
| 16 | 1.013500 | 12.0 |
| 18 | 0.900000 | 12.8 |
| 20 | 0.810000 | 13.0 |
| 24 | 0.675000 | 13.8 |
| 25 | 0.648000 | 14.0 |
| 27 | 0.600000 | 14.3 |
| 30 | 0.540000 | 14.8 |
| 32 | 0.506250 | 15.1 |
| 36 | 0.450000 | 15.6 |
| 40 | 0.405000 | 16.0 |
| 45 | 0.360000 | 16.5 |
| 48 | 0.337500 | 16.8 |
| 50 | 0.324000 | 17.0 |
| 54 | 0.300000 | 17.3 |
| 60 | 0.270000 | 17.8 |
| 64 | 0.253125 | 18.1 |

FIG. 6

| MODULATION | CODE RATE | | | SPECTRAL EFFICIENCY | Es/No | Eb/No | BANDWIDTH | CHIPS/SYMBOL | SYMBOL RATE | INFO RATE | PROC. GAIN |
|---|---|---|---|---|---|---|---|---|---|---|---|
| k | j | n | j/n | η | (dB) | (dB) | (MHz) | m | (MSym/s) | (MBPS) | (dB) |
| 2 | 1 | 4 | 0.25 | 0.01 | -2.35 | 0.66 | 32.4 | 64 | 0.506250 | 0.253125 | 18.06 |
| 2 | 1 | 4 | 0.25 | 0.01 | -2.35 | 0.66 | 32.4 | 60 | 0.540000 | 0.270000 | 17.78 |
| 2 | 1 | 4 | 0.25 | 0.01 | -2.35 | 0.66 | 32.4 | 54 | 0.600000 | 0.300000 | 17.32 |
| 2 | 1 | 4 | 0.25 | 0.01 | -2.35 | 0.66 | 32.4 | 50 | 0.648000 | 0.324000 | 16.99 |
| 2 | 1 | 4 | 0.25 | 0.01 | -2.35 | 0.66 | 32.4 | 48 | 0.675000 | 0.337500 | 16.81 |
| 2 | 1 | 4 | 0.25 | 0.01 | -2.35 | 0.66 | 32.4 | 45 | 0.720000 | 0.360000 | 16.53 |
| 2 | 1 | 4 | 0.25 | 0.01 | -2.35 | 0.66 | 32.4 | 40 | 0.810000 | 0.405000 | 16.02 |
| 2 | 1 | 4 | 0.25 | 0.01 | -2.35 | 0.66 | 32.4 | 36 | 0.900000 | 0.450000 | 15.56 |
| 2 | 1 | 4 | 0.25 | 0.02 | -2.35 | 0.66 | 32.4 | 32 | 1.012500 | 0.506250 | 15.05 |
| 2 | 1 | 4 | 0.25 | 0.02 | -2.35 | 0.66 | 32.4 | 30 | 1.080000 | 0.540000 | 14.77 |
| 2 | 1 | 4 | 0.25 | 0.02 | -2.35 | 0.66 | 32.4 | 27 | 1.200000 | 0.600000 | 14.31 |
| 2 | 1 | 4 | 0.25 | 0.02 | -2.35 | 0.66 | 32.4 | 25 | 1.296000 | 0.648000 | 13.98 |
| 2 | 1 | 4 | 0.25 | 0.02 | -2.35 | 0.66 | 32.4 | 24 | 1.350000 | 0.675000 | 13.80 |
| 2 | 1 | 4 | 0.25 | 0.03 | -2.35 | 0.66 | 32.4 | 20 | 1.620000 | 0.810000 | 13.01 |
| 2 | 1 | 4 | 0.25 | 0.03 | -2.35 | 0.66 | 32.4 | 18 | 1.800000 | 0.900000 | 12.55 |
| 2 | 1 | 4 | 0.25 | 0.03 | -2.35 | 0.66 | 32.4 | 16 | 2.025000 | 1.012500 | 12.04 |
| 2 | 1 | 4 | 0.25 | 0.03 | -2.35 | 0.66 | 32.4 | 15 | 2.160000 | 1.080000 | 11.76 |
| 2 | 1 | 4 | 0.25 | 0.04 | -2.35 | 0.66 | 32.4 | 12 | 2.700000 | 1.350000 | 10.79 |
| 2 | 1 | 4 | 0.25 | 0.05 | -2.35 | 0.66 | 32.4 | 10 | 3.240000 | 1.620000 | 10.00 |
| 2 | 1 | 4 | 0.25 | 0.06 | -2.35 | 0.66 | 32.4 | 9 | 3.600000 | 1.800000 | 9.54 |
| 2 | 1 | 4 | 0.25 | 0.06 | -2.35 | 0.66 | 32.4 | 8 | 4.050000 | 2.025000 | 9.03 |
| 2 | 1 | 4 | 0.25 | 0.08 | -2.35 | 0.66 | 32.4 | 6 | 5.400000 | 2.700000 | 7.78 |
| 2 | 1 | 4 | 0.25 | 0.10 | -2.35 | 0.66 | 32.4 | 5 | 6.480000 | 3.240000 | 6.99 |
| 2 | 1 | 4 | 0.25 | 0.13 | -2.35 | 0.66 | 32.4 | 4 | 8.100000 | 4.050000 | 6.02 |
| 2 | 1 | 4 | 0.25 | 0.17 | -2.35 | 0.66 | 32.4 | 3 | 10.800000 | 5.400000 | 4.77 |
| 2 | 1 | 4 | 0.25 | 0.25 | -2.35 | 0.66 | 32.4 | 2 | 16.200000 | 8.100000 | 3.01 |

| MODULATION | CODE RATE (j/n) | | | SPECTRAL EFFICIENCY | Es/No | Eb/No | BANDWIDTH | CHIPS/SYMBOL | SYMBOL RATE | INFO RATE | PROC. GAIN |
|---|---|---|---|---|---|---|---|---|---|---|---|
| k | j | n | j/n | η | (dB) | (dB) | (MHz) | m | (MSym/s) | (MBPS) | (dB) |
| 2 | 1 | 4 | 0.25 | 0.01 | -2.35 | 0.66 | 32.4 | 64 | 0.506280 | 0.263125 | 18.08 |
| 2 | 1 | 4 | 0.25 | 0.01 | -2.35 | 0.66 | 32.4 | 60 | 0.540000 | 0.270000 | 17.78 |
| 2 | 1 | 4 | 0.25 | 0.01 | -2.35 | 0.66 | 32.4 | 54 | 0.600000 | 0.300000 | 17.32 |
| 2 | 1 | 4 | 0.25 | 0.01 | -2.35 | 0.66 | 32.4 | 50 | 0.648000 | 0.324000 | 16.99 |
| 2 | 1 | 4 | 0.25 | 0.01 | -2.35 | 0.66 | 32.4 | 48 | 0.675000 | 0.337500 | 16.81 |
| 2 | 1 | 4 | 0.25 | 0.01 | -2.35 | 0.66 | 32.4 | 45 | 0.720000 | 0.360000 | 16.53 |
| 2 | 1 | 4 | 0.25 | 0.02 | -2.35 | 0.66 | 32.4 | 40 | 0.810000 | 0.405000 | 16.02 |
| 2 | 1 | 4 | 0.25 | 0.02 | -2.35 | 0.66 | 32.4 | 36 | 0.900000 | 0.450000 | 15.56 |
| 2 | 1 | 4 | 0.25 | 0.02 | -2.35 | 0.66 | 32.4 | 32 | 1.013500 | 0.506250 | 15.05 |
| 2 | 1 | 4 | 0.25 | 0.02 | -2.35 | 0.66 | 32.4 | 30 | 1.080000 | 0.540000 | 14.77 |
| 2 | 1 | 4 | 0.25 | 0.02 | -2.35 | 0.66 | 32.4 | 27 | 1.200000 | 0.600000 | 14.31 |
| 2 | 1 | 4 | 0.25 | 0.02 | -2.35 | 0.66 | 32.4 | 25 | 1.296000 | 0.648000 | 13.98 |
| 2 | 1 | 4 | 0.25 | 0.02 | -2.35 | 0.66 | 32.4 | 24 | 1.350000 | 0.675000 | 13.80 |
| 2 | 1 | 4 | 0.25 | 0.03 | -2.35 | 0.66 | 32.4 | 20 | 1.620000 | 0.810000 | 13.01 |
| 2 | 1 | 4 | 0.25 | 0.03 | -2.35 | 0.66 | 32.4 | 18 | 1.800000 | 0.900000 | 12.55 |
| 2 | 1 | 4 | 0.25 | 0.03 | -2.35 | 0.66 | 32.4 | 16 | 2.025000 | 1.013500 | 12.04 |
| 2 | 1 | 4 | 0.25 | 0.03 | -2.35 | 0.66 | 32.4 | 15 | 2.160000 | 1.080000 | 11.76 |
| 2 | 1 | 4 | 0.25 | 0.04 | -2.35 | 0.66 | 32.4 | 12 | 2.700000 | 1.350000 | 10.79 |
| 2 | 1 | 4 | 0.25 | 0.05 | -2.35 | 0.66 | 32.4 | 10 | 3.240000 | 1.620000 | 10.00 |
| 2 | 1 | 4 | 0.25 | 0.06 | -2.35 | 0.66 | 32.4 | 9 | 3.600000 | 1.800000 | 9.54 |
| 2 | 1 | 4 | 0.25 | 0.06 | -2.35 | 0.66 | 32.4 | 8 | 4.050000 | 2.025000 | 9.03 |
| 2 | 1 | 4 | 0.25 | 0.08 | -2.35 | 0.66 | 32.4 | 6 | 5.400000 | 2.700000 | 7.78 |
| 2 | 1 | 4 | 0.25 | 0.10 | -2.35 | 0.66 | 32.4 | 5 | 6.480000 | 3.240000 | 6.99 |
| 2 | 1 | 4 | 0.25 | 0.18 | -2.35 | 0.66 | 32.4 | 4 | 8.100000 | 4.050000 | 6.02 |
| 2 | 1 | 4 | 0.25 | 0.17 | -2.35 | 0.66 | 32.4 | 3 | 10.800000 | 5.400000 | 4.77 |
| 2 | 1 | 3 | 0.33 | 0.22 | -1.04 | 0.52 | 32.4 | 3 | 10.800000 | 7.200000 | 4.77 |
| 2 | 1 | 4 | 0.25 | 0.25 | -2.35 | 0.66 | 32.4 | 2 | 16.200000 | 8.100000 | 3.01 |
| 2 | 1 | 3 | 0.33 | 0.33 | -1.24 | 0.52 | 32.4 | 2 | 16.200000 | 10.800000 | 3.01 |
| 2 | 2 | 5 | 0.40 | 0.40 | -0.30 | 0.67 | 32.4 | 2 | 16.200000 | 12.960000 | 3.01 |

SYSTEM AND METHOD FOR ADAPTIVE INFORMATION RATE COMMUNICATION

FIELD

The present disclosure relates to methods and systems for communicating from a transmitter to multiple receive terminals having wide ranging and diverse performance and operating conditions, e.g., communicating with mobile terminals through satellites with adaptable forward link information rates and adaptive coding and modulation

BACKGROUND

Broadband communications access, on which our society and economy is growing increasingly dependent, is becoming pervasive in all aspects of daily societal functions. For example, broadband communication has become increasingly available to users on board mobile platforms such as aircraft, ships, automobiles and trains. Broadband communication services for passengers of mobile platforms include Internet access, e.g., e-mail and web browsing, live television, voice services, virtual private network access and other interactive and real time services. While the technology exists to deliver broadband communication services to effectively all types user terminals, e.g., mobile platforms, affordable delivery of these services has been a challenge for communication systems that serve a wide range of communication terminals having wide ranging capability and operating in a wide range of time varying link conditions. The problem is particularly acute for mobile communication terminals that must often be smaller than convention fixed terminals and must operate under a greater range of conditions.

Broadband communication systems for remote, hard to access, or mobile user terminals, e.g., mobile platforms, often use communication satellites that can provide service coverage over large footprints, often including remote land regions and oceans For such satellite communications systems that employ geosynchronous satellites, the footprint often covers a relatively fixed region of the earth. For satellite communications systems that employ satellites with low and medium earth orbits, the footprints cover a moving region, in other words the footprints sweep across the earth. Generally, base stations, e.g., a ground based station, send data and information to the user terminals through a bent pipe via one or more satellites. More specifically, the base stations send data information on a forward link to the satellite transponder that receives, amplifies and re-transmits the data and information to an antenna of one or more user terminals, e.g., fixed locations on the earth or one or more mobile platforms such as aircraft, ships, trucks, trains, etc. The user terminals, in turn, can send data back to the base stations via the satellite transponder. The base stations can provide the user terminals with links to the Internet, public switched telephone networks, and/or other public or private networks, servers and services.

In many applications in which maximum efficiency is required, the forward link from the base station to the user terminals of communication systems is commonly operated with a single carrier so that the power amplifier in the transmitter can operate at the maximum saturated power level without significant degradation due to nonlinear mixing of multiple carriers. In satellite communication systems, maximum efficiency is achieved when the transponder operates at its saturated output power level. That is, the satellite communication systems are operated with little or no transponder output back-off. Typically, single carrier operations utilize time division multiplexing access (TDMA) to share the communication channel between multiple receiving user terminals in the coverage region for the communication system. All data and information destined for user terminals within the transponder coverage region is typically transmitted using a waveform, having FEC coding, modulation, and information rate, that can be successfully received by all user terminals in the coverage region. The problem with this type of operation is the inefficiency that occurs when there is a wide range of user terminal antenna sizes, loss conditions, e.g., rain fade, and satellite downlink effective isotropic radiated power (EIRP) variation within the coverage region.

In satellite communication systems of this type, the forward link waveform is selected to "close" the communication link with the most "disadvantaged" user terminal. That is, the forward link waveform is selected to establish a successful communication link between the base station and the user terminal having the smallest antenna size, highest rain fade and/or, lowest satellite downlink EIRP location. Therefore, the most "advantaged" user terminals, i.e., the user terminals having the largest antenna size, no rain fade and/or a high satellite EIRP location, operate with excess margin. In many instances, the dynamic range between the most disadvantaged and most advantaged user terminals can be greater than a factor of 100 (20 dB), which can result in large inefficiency when conveying unicast and/or multicast traffic. Thus, the excess margin available to advantaged user terminals that could be converted into higher information rates to reduce the cost per bit to deliver information to the user terminals is unused.

Adaptive coding and modulation (ACM) has sometimes been utilized in attempts to address the problems of such "one size fits all" approaches. ACM dynamically adjusts forward error correction coding (FEC), often referred to as simply "coding", and signal modulation to adapt to the conditions of the communications link to each individual terminal. Thus, a disadvantaged user terminal is sent information with a different coding rate and modulation order than an advantaged terminal. Despite the potential performance improvements provided by ACM, the range of terminals and link conditions over which these performance gains can be achieved is limited. For example, the range of user terminal antenna aperture sizes at which coding and modulation changes are effective at adapting to link conditions is mostly limited to standard sized VSATs (very small aperture terminals). Generally, in the United States, VSATs are very common throughout the U.S. and the world with hundreds of thousands of the terminals deployed in fixed locations such as gas stations, banks, etc. These terminals generally have apertures greater than 0.8 meters in diameter at Ku-band and 3 meters at C-band. Thus, ACM is not useful for a wide range of "smaller-than-VSAT sized terminals", which are commonly used for satellite communication to mobile users terminals. For example, ACM is not useful for most user terminals on board mobile platforms, such as aircraft, trucks, automobiles, boats, trains, etc., that cannot accommodate a full-sized VSAT.

Additionally, with ACM, as a user terminal of any size becomes more and more disadvantaged, due to deteriorating link conditions, the receive Eb/No becomes smaller and smaller. In response, the ACM continuously attempts to decrease the threshold Eb/No to maintain a positive link margin by reducing the code rate and by reducing the order of modulation. Generally, margin is defined as the difference between the receive Eb/No and the threshold Eb/No, and excess margin is defined as margin greater than a prudent safety margin for unknown losses and variations in the link. For example, the excess margin is typically less than 2 dB. Eventually, the threshold Eb/No can not be further reduced by further reduction of the coding rate and the order of modulation. At this point, the ACM concept breaks down because no amount of additional reduction in code rate or order of modulation can be applied to reduce the threshold Eb/No in order to maintain a positive margin.

Figure 1:
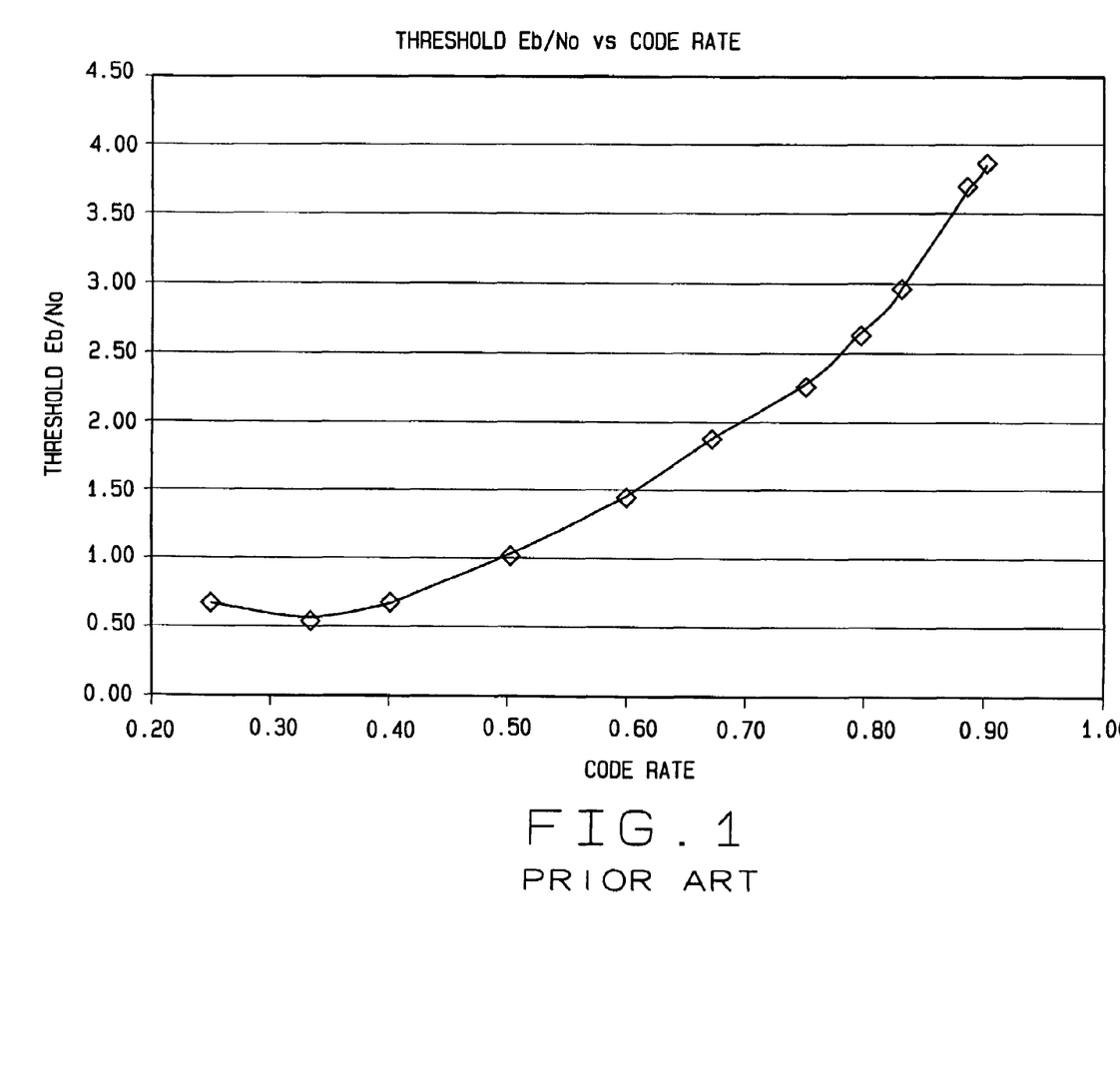
FIG. 1 is a prior art graphical illustration of threshold energy per bit over noise power spectral density (Eb/No) versus code rate for a typical low density parity check (LDPC) signal forward error correction (FEC) method using quadrature phase-shift keying operation at BER=1E−7.
Figure 2:
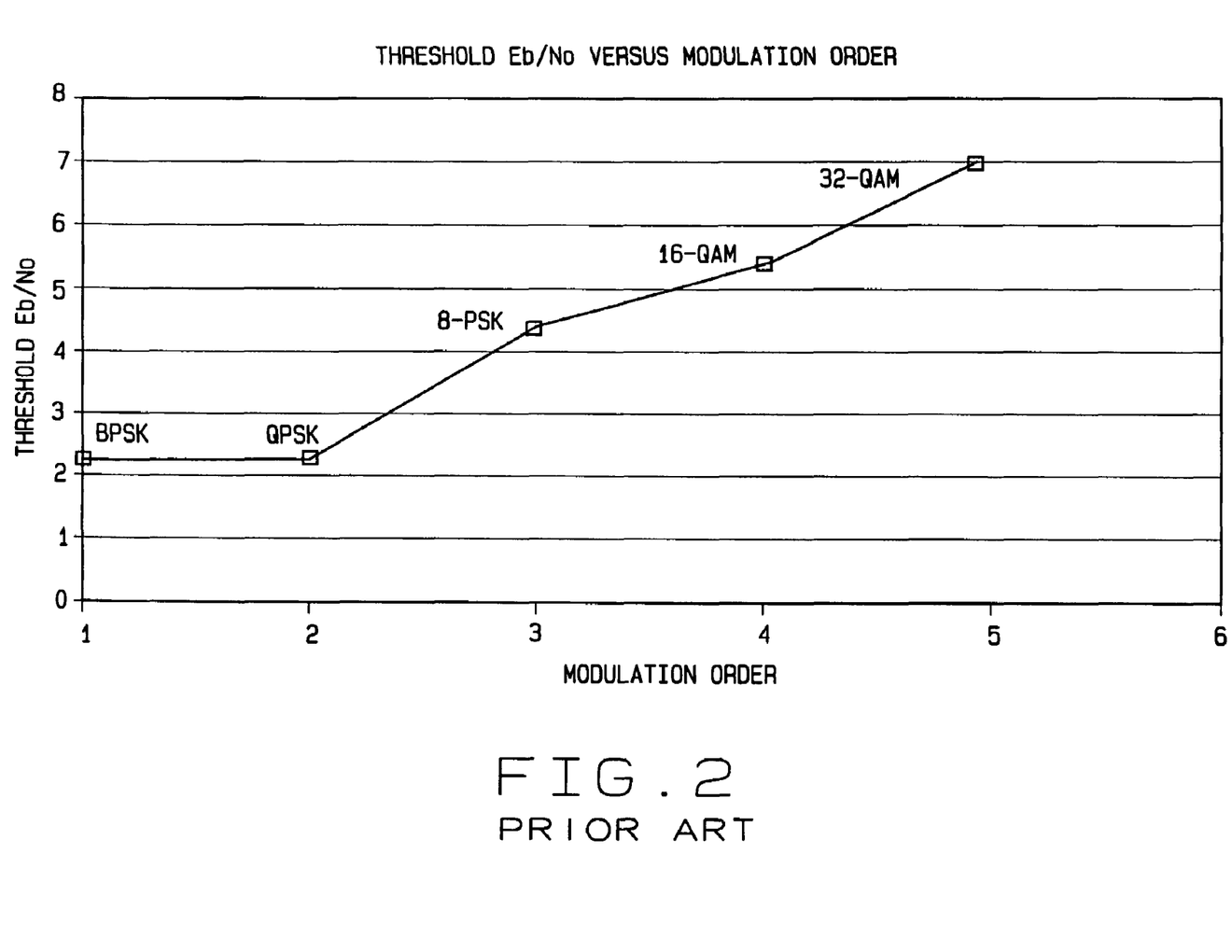
FIG. 2 is a prior art graphical illustration of threshold Eb/No versus modulation order for the typical LDPC signal FEC method shown in FIG. 1.

Furthermore, as exemplarily illustrated in FIGS. 1 and 2, most practical systems that do not employ spread spectrum modulation have a symbol rate Rs that is approximately equal to an occupied signal bandwidth (W). Once the modulation order and code rate are set to their limits for minimizing threshold Eb/No and maximizing power efficiency, i.e., they are set to constant values, then the symbol rate Rs is approximately equal to the information rate Ri. Therefore, changes in information rate Ri to adapt to different link conditions necessarily create proportional changes in the signal bandwidth W. Accordingly, it is desirable to keep the occupied signal bandwidth constant as the information rate Ri is changed to adapt to link conditions. Therefore, conventional (non-spread-spectrum) methods are not suitable. For example, the relationship between threshold Eb/No and code rate for a particular forward error correction type called low density parity check (LDPC) is shown in FIG. 1 (assuming QPSK modulation). As illustrated, the threshold Eb/No decreases as the code rate decreases until a minimum is reached at a code rate=1/3. A similar example showing the reduction of threshold Eb/No with order of modulation, is shown in FIG. 2. As illustrated, the minimum threshold Eb/No occurs when for a code rate=1/3 and modulation order=2 (QPSK modulation). Once the code rate and the modulation order reach these values, a positive margin can no be maintained to adapt to a fading condition on the link by further reducing the code rate and modulation order, Therefore, the occupied signal bandwidth W can not be held constant.

SUMMARY

In various embodiments, a method for communicating information from a base station to one or more user terminals via a forward link to a relay and distribution device is provided. The method includes determining a separate information rate for information to be transmitted from the base station to each of the user terminals. Each information rate is determined to allow successful communication with the respective user terminal and provide a predetermined amount of margin above a threshold energy-to-noise spectral density ratio (Eb/No) on the forward link. The method additionally includes formatting data received at the base station into a continuous time division multiplexed (TDM) data stream. The TDM data stream includes a plurality of data frames to be transmitted to the user terminals via the forward link. Each data frame is formatted to have the determined information rate of the respective user terminal that is to receive the data frame. The method further includes transmitting the TDM data stream using a single carrier of the forward link and continuously and dynamically adjusting the information rate of subsequent data frames for each user terminal to maintain successful communication and maintain the predetermined amount of margin as operating conditions of each user terminal change.

Further areas of applicability of the present disclosure will become apparent from the detailed description provided hereinafter. It should be understood that the detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of various embodiment(s) is merely exemplary in nature and is in no way intended to limit the disclosure, its application, or uses.

Figure 3:
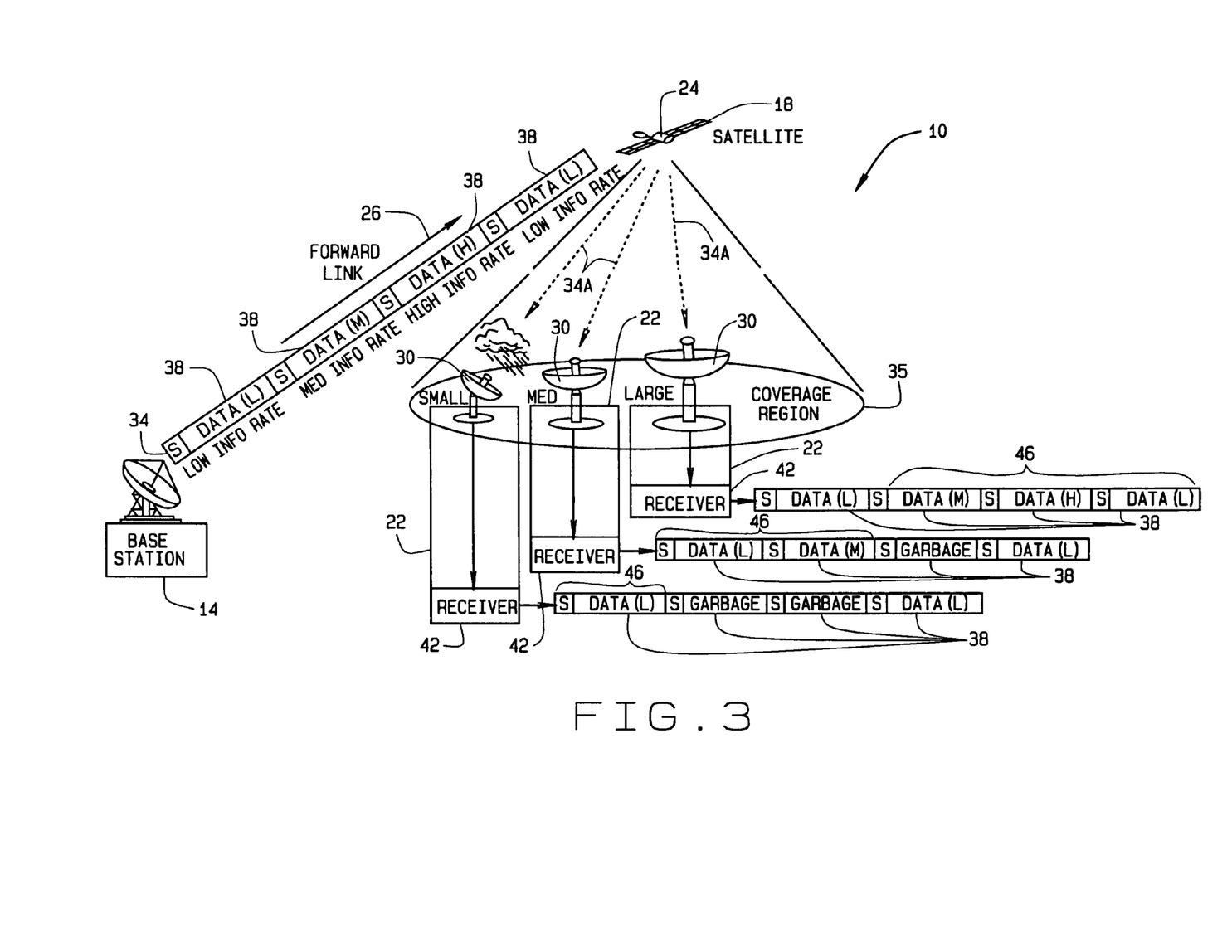
FIG. 3 illustrates a communication system utilizing an adaptive information rate (AIR) method for communicating with a plurality of user terminals, in accordance with various embodiments of the present disclosure.

FIG. 3 illustrates a communication system 10 in accordance with various embodiments of the present disclosure. The communication system 10 includes a base station 14, an optional relay and distribution device 18 and one or more user terminals 22. As shown in FIG. 3, in various implementations, communication system 10 can be satellite communication system wherein the base station 14 is a satellite ground based station, the relay and distribution device 18 is a satellite 18 that covers a region of the earth that includes the one or more user terminals 22, for example one or more mobile platforms including user terminals 22. Although, the various embodiments of the communication system 10 will been described and illustrated herein in reference to a satellite communication, it should be understood that the communication system 10, as described herein, is applicable to other type of communication systems. For example, the various embodiments described and illustrated herein are applicable to any digital communication systems 10 that must send information to diverse user terminals 22 having different antenna gains and experience different signal loss conditions, e.g., fading, using a single common communication carrier. Such a digital communication system 10 could be a terrestrial cellular communication system, wherein the forward communication link is established between a base station 14 and user terminals 22, e.g., cellular handsets. In such a digital communication system 10 the relay and distribution device 18 would be eliminated and the base station 14 would communicate directly with the user terminals 22, e.g., cellular handsets. In other various embodiments, a digital communication system 10 communicates between the base station 14 as the user terminals 22, as described herein, via a relay and distribution device 18 comprising a repeater remotely located from the base station 14, e.g., on land, a ship, a trains, etc.

The base station 14 transmits information, e.g., data, to a satellite transponder 24 of the satellite 18 over a forward link 26. The transponder 18, in turn, transmits, or relays, the data and information to the one or more user terminals 22, e.g., one or more mobile platforms including user terminals 22. More particularly, the transponder 24 transmits/relays the information to a user terminal antenna 30 of each user terminal 22. Conversely, the user terminals 26 can send data to the base stations 14 via a return link 32, shown in FIG. 4, through the satellite transponder 24. The base station 14 can provide the user terminals 26 with links to the Internet, a public switched telephone network (PSTN ), private networks such as corporate and government networks, and/or other servers and services.

While the present disclosure will be described in conjunction with "bent-pipe" satellite systems, skilled artisans will appreciate that the present disclosure is applicable for other types of satellite systems. For example, satellite systems with on-board packet switching are also contemplated. Or, as described above, in various embodiments, the system 10 can be other types communication systems, wherein the forward and return links are established between the base station 14 and the user terminals 22 either directly or using means other than satellite 18, e.g., terrestrial wireless or wired networks.

Operation of the communication system 10, as described herein, provides an efficient method of communicating to a wide range of user terminals, including small mobile terminals such as user terminals 22, wherein the various user terminal antennas 30 have a wide range of sizes and loss conditions, e.g., rain fade. As used herein, the term efficiency is defined as the capacity of the forward link 26, wherein capacity is the aggregate information rate conveyed on a forward link signal 34.

In various embodiments, the forward link 26 comprises a continuous time division multiplexed (TDM) electromagnetic signal 34 transmitted by the base station 14 to the satellite transponder 24 using a single carrier. The signal 34 includes TDM data and information for transmission to the one or more user terminals 22 in a satellite 18 coverage region 35. The signal 34 is amplified by the satellite transponder 24 and directed downward towards the earth coverage region. The amplified signal is indicated in FIG. 3 as 34A. As shown in FIG. 3, the satellite transponder 24 routes the amplified signal 34A to the one or more user terminals that are to receive the data and information. The antennas 30 of the user terminals 22 on the earth, i.e., on land, sea and/or in the air, receiving the forward link signal 34A may have different aperture sizes, may be experiencing different loss conditions, e.g., rain fade, and/or may be receiving different EIRP from the satellite transponder 24 because of its geographic location within the satellite coverage region 35.

As described above, adaptive coding and modulation (ACM) has been employed to attempt to utilize excess or wasted link margin to advantaged user terminals, such as the user terminals 22 having the largest antenna 30 aperture under clear sky conditions. However, the amount of coding and modulation that can be used to adapt to disadvantaged terminals reaches a limit for disadvantaged user terminals 22 having smaller than conventional VSAT terminals antennas 30. In accordance with various embodiments of the present disclosure, to adapt to varying link conditions, the base station 14 varies the information rate (Ri), as described further below. Generally, when the coding and modulation reach their limits using the ACM method, any change in Ri must produce a change in the symbol rate (Rs), as illustrated by the equation;

$$Ri = Rsk(j/n), \quad (1)$$

wherein (j/n) is the code rate and the modulation is assumed to have k bits per symbol such that modulation $M=2^k$. The product of k times (j/n) is often defined as the spectral efficiency, $\eta$. For example, for 8-ary (8-PSK) signaling (k=3) and for a 1/3 coding rate (j/n=1/3), the spectral efficiency is $\eta=1$ and the information rate, Ri, is equal to the symbol rate, Rs. Any small overhead associated with framing, header, etc., is ignored in this equation and throughout the remainder of this disclosure.

Generally, for most practical systems that do not employ spread spectrum modulation, the symbol rate Rs is approximately equal to the occupied signal bandwidth (W). Once k and (j/n) are set to their limits for minimizing the threshold Eb/No and maximizing power efficiency, i.e., they are set to constant values, then the symbol rate Rs is approximately equal to the information rate Ri, and therefore changes in information rate Ri, to adapt to different link conditions, necessarily create proportional changes in the signal bandwidth W. Thus, the occupied signal bandwidth W changes with information rate Ri to adapt to link conditions and antenna sizes.

The communication system 10, as described herein, keeps the occupied signal bandwidth constant as the information rate Ri is changed to adapt to link conditions. Therefore, conventional (non-spread-spectrum) methods are not suitable. For most forward error correction types, the threshold Eb/No decreases as the code rate (j/n) decreases until a minimum threshold Eb/No is reached (assuming fixed modulation), as illustrated in FIG. 1, for low density parity check (LDPC) FEC. Similarly, threshold Eb/No is reduced with order of modulation k, as illustrated in FIG. 2. Once the code rate (j/n) and the order of modulation k reach the values where the minimum threshold Eb/No occurs and are held constant, only the information rate Ri can be adjusted to maintain a positive margin to adapt to a fading condition on the link. This necessarily results in variations in occupied signal bandwidth W.

A threshold Eb/No is defined herein as the Eb/No level at which the bit error rate (BER) of the communication link, e.g., forward link 26, becomes quasi error free. The more coding, e.g., redundant bits, that are inserted into an information stream, e.g., TDM signal 34, the lower the threshold Eb/No. More coding is added as the code rate j/n decreases. Similarly, the threshold Eb/No can also be reduced by lowering the order of modulation, that is, using smaller values of k in equation (1). Accordingly, there is a complex nonlinear relationship between threshold Eb/No, the coding rate (j/n) and the modulation constant (k), such that as code rate j/n decreases the incremental reduction of threshold Eb/No becomes less and less, until there is negligible improvement in threshold Eb/No as the code rate j/n is decreased.

Thus, with typical ACM, as a user terminal, e.g., user terminal 22, becomes more and more disadvantaged, the receive Eb/No becomes smaller and smaller. In response, assuming constant signal bandwidth, the ACM continuously decreases the threshold Eb/No, to maintain positive link margin, by adding more and more coding, i.e., lowering the code rate j/n, and reducing the order of modulation, i.e., reducing the modulation constant k. Eventually no improvement is gained by adding more coding, and the order of modulation has reached its minimum (k=1 of k=2). At this point only the information rate Ri can be reduced to keep the received Eb/No at user terminals 22 above the Eb/No threshold. However, as illustrated in equation (1), when employing ACM, the symbol rate Rs cannot be held constant if the information rate Ri is reduced once k and j/n are held constant at the values giving minimum Eb/No.

Still referring to FIG. 3, generally, in accordance with various embodiments of the present disclosure, the base station 14 determines a maximum information rate Ri that allows successful communication, i.e., link closure, with a small positive margin to each user terminal 22. The information rate Ri is continuously and dynamically adjusted by the base station 14 to achieve link closure based on the instantaneous operation conditions of each user terminal 22 to which it is sending information. For example, as illustrated in FIG. 3, the antennas 30 of three different user terminals 22 have three different aperture sizes, e.g., small, medium and large. Via the TDM signal 34, the base station 14 uses the lowest information rate to communicate with the most disadvantaged user terminal 22, having the smallest antenna 30 aperture and experiencing the highest rain loss,. Conversely, the base station 14 communicates, via the TDM signal 34, with the user terminal 22 having the largest antenna 30 aperture and no rain loss using the highest information rate.

More particularly, the base station 14 formats incoming data, received from various data and information sources (not shown), into the time division multiplexed (TDM) continuous stream of traffic, i.e., TDM signal 34. The TDM signal is comprised of frames of data 38 destined for individual user terminals 22, i.e., unicast, and/or groups of user terminals 22, i.e., multicast. Each frame of data 38 may have a different information rate. Each frame of data 38 contains a string of bits, called a synchronization word (S) that is inserted into the data frame. The synchronization word S is used to synchronize all user terminals 22 in the satellite coverage region 35 to the frequency, phase and data rate of the forward link signal 34. The synchronization bits S are transmitted at a sufficiently low information rate that all user terminals 22, even the most disadvantaged, can acquire and synchronize to it. More specifically, each data frame 38 contains the same synchronization word S transmitted at the same information rate Ri, regardless of the information rate Ri of the rest of the information in the data frame 38. Thus, the same synchronization word S is transmitted to all user terminals 22 at the same information rate Ri, which is selected to be low enough so that all user terminals 22, including the most disadvantaged, stay synchronized to it. Each user terminal 22 must be able to successfully receive the synchronization word S at the beginning of each frame, even if the respective user terminal 22 can not successfully receive the rest of the information in the data frame 38. Therefore, the information rate of the synchronization word S can be less than the information rate Ri at which the rest of the information in the data frame 38 is transmitted. Each user terminal antenna 30 is communicatively connected to a receiver 42 that functions to demodulate and decode the received signals 34A from the antenna 30.

In accordance with various embodiments, as exemplarily illustrated in FIG. 3, the data frames 38 transmitted at the highest information rate Ri, identified as 'Data (H)', can only be successfully received by the most advantaged user terminal(s) 22. The less advantaged small and medium sized terminal receivers 42 cannot properly demodulate and decode the highest information rate frames 38 intended for the most advantaged user terminal(s) 22. Thus, the less advantaged small and medium sized terminal receivers 42 output random bits, designated as 'GARBAGE' in FIG. 3, that are discarded as erroneous frames. Similarly, the smallest user terminal(s) 22 cannot successfully receive frames of data 38 directed to the medium sized user terminal(s) 22 and transmitted at a medium information rate Ri, identified as 'Data (M)'. Thus, those 'GARGAGE' frames 38 are discarded by the receiver(s) 42 of the least advantaged smallest user terminal(s) 22. Accordingly, the least advantaged user terminal can only demodulate and decode data frames 38 transmitted at a low information rate Ri, identified as 'Data (L)'. The most advantaged terminal(s) 22 can successfully receive all frames 38, even though the frames 38 may be destined for other user terminals 22. Each respective user terminal 22 can identify those data frames 38 intended to be received by the user terminal 22, i.e., targeted for the user terminal 22, by reading an address embedded in the header of IP data packets that comprise one or more data frames 38. Exemplary IP data packets are identified in FIG. 3 by the reference numeral 46.

Figure 4:
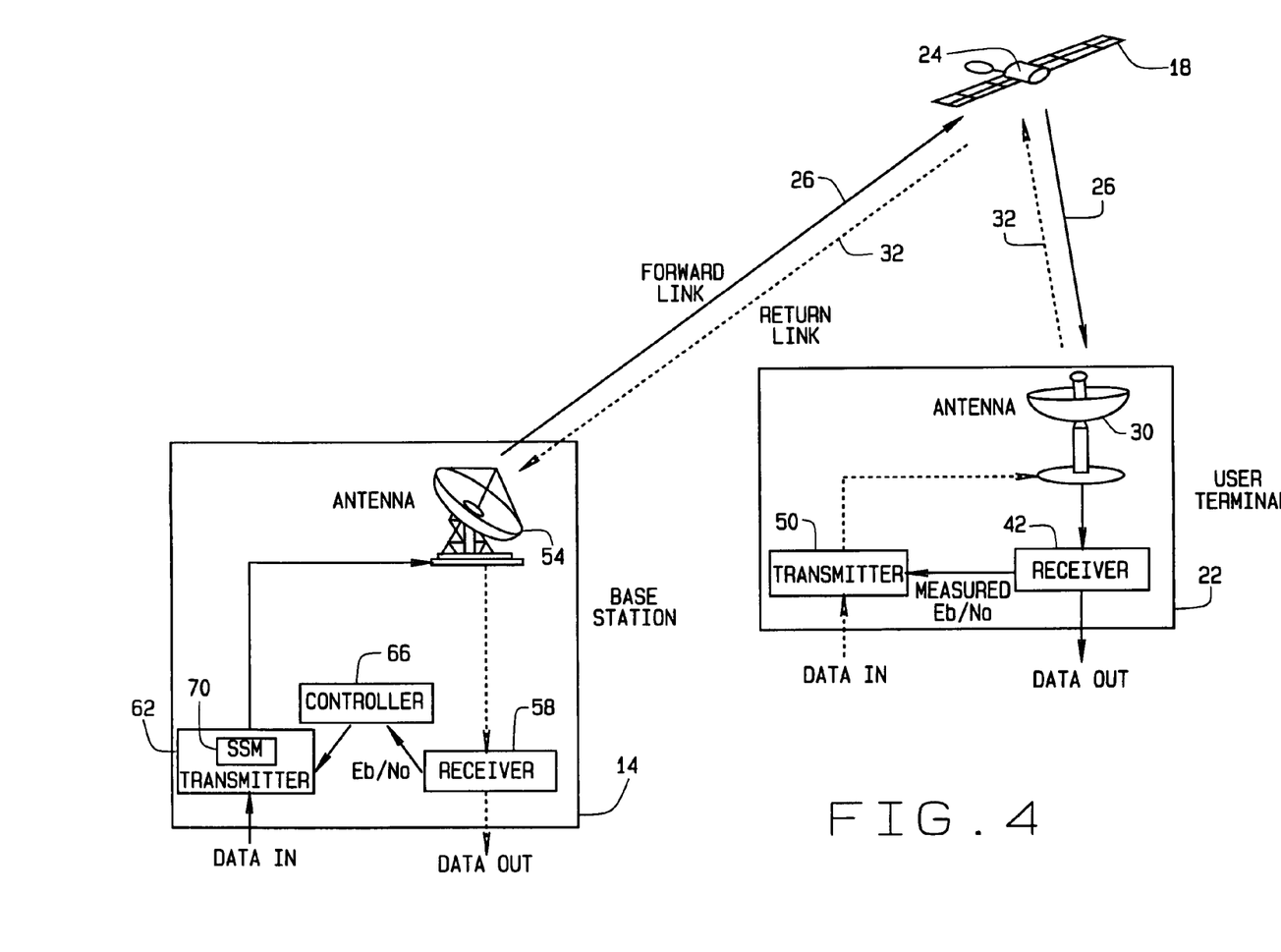
FIG. 4 is a block diagram illustrating various functional components of a user terminal and a base station included in the communication system shown in FIG. 3.

Referring now to FIG. 4, in various embodiments, each user terminal 22 generally includes the respective antennas 30 and receivers 42 and a transmitter 50 communicatively connected to the respective receiver 42. Each user terminal receiver 42 continuously measures the signal energy to noise ratio, e.g., Eb/No, of the frames sent to it within the received TDM signal 34A and sends the measured Eb/No to the respective user terminal transmitter 50. Each user terminal transmitter 50 multiplexes the measured received Eb/No data into a bit stream transmitted back to the base station 14 via the return link 32. Although FIG. 4 illustrates a transponded satellite link, the disclosure, as described herein, should not be so limited. More particularly, the return link used to convey measured receive Eb/No back to base station 14 can use any wireless or wired signal path and remain within the scope of the disclosure.

The base station 14 includes an antenna 54, a receiver 58, a transmitter 62 and a controller 66 that communicates with and controls the operation of receiver 58 and transmitter 62. The multiplexed measured Eb/No data stream from each user terminal 22 is transmitted over the return link 32 to the base station antenna 54 via the optional satellite transponder 24. The base station antenna 54, in turn, sends the multiplexed measured Eb/No data stream from each user terminal 22 to the base station receiver 58. The base station receiver 58 separates the received Eb/No data from each user terminal 22 for the received return link signal(s) 32 and forwards the separated Eb/No data streams to the base station controller 66. The base station controller 66 executes one or more algorithms to calculate an Eb/No forward link margin for each received Eb/No measurement from user terminals 22. Particularly, the base station controller 66 subtracts a predetermined threshold Eb/No for the forward link 26 from each of the Eb/No ratios measured by the user terminals 22. The threshold Eb/No value can be determined from a look-up table that provides threshold Eb/No as a function of code rate (j/n) and modulation order k. The look-up table resides in controller 66. The data used to populate the threshold Eb/No table is predetermined from measured or theoretical performance.

In an alternative implementation, the margin is calculated by a controller in each user terminal 22, and the user terminals 22 calculate the information rate, coding or modulation changes necessary to maintain a target level of margin.

The controller 66 then executes one or more algorithms to determine an information rate Ri at which to transmit each TDM signal frame to the target user terminal 22 such that link margin of the forward link signal 26 is received at user terminal 22 at a predetermined level above the threshold Eb/No called the target margin. Any margin above the target margin is called excess margin that is effectively eliminated by the communication system 10, as described herein. For example, for information transmitted from the base station 14 and targeted, or destined, for the most disadvantaged user terminal(s) 22, the base station controller 66 decides to transmit the 'Data (L)' frames 38 at a first information rate Ri that is chosen to achieve the target margin when the 'Data (L)' frames 38 are received by the user terminals 22 having small antennas 30. Similarly, for information sent to moderately disadvantaged user terminal(s) 22 having medium sized antennas 30, the base station controller 66 will transmit the 'Data (M)' frames 38 at a second information rate Ri that is more than the first information rate Ri and selected by the controller 66 so that the Eb/No of the TDM signal received by the medium sized antennas 30 is at the target margin above the threshold Eb/No during transmission of the 'Data (M)' frames 38. Finally, for information sent to the least disadvantaged user terminal(s) 22 having the largest antennas 30, the base station controller 66 decides to transmit the 'Data (H)' frames 38 at a third information rate Ri that is more than the second information rate Ri and is chosen to achieve the target margin when the 'Data (H)' frames 38 are received by the user terminals 22 having the largest antennas 30.

Thus, the base station controller 66 can command an increase, decrease, or no change to the margin on the forward link 26 for each TDM signal frame 38 by varying the information rate Ri in response to the energy per bit to noise power spectral density ratio Eb/No of the signal 34A received at the particular target user terminal 22. Thus, an active control loop is created wherein each user terminal 22 communicates the measured Eb/No for signals 34A received by the particular user terminal 22 to the base station 14. In response to each received measured Eb/No, the base station controller 66 adjusts the information rate Ri of each TDM signal frame, as necessary, to maintain a desired link margin for the forward link 26. The Eb/No of the signals received by the user terminals 22 is inversely proportional to the information rate Ri, because the energy per bit (Eb) is proportionally to the bit time, which is inversely proportional to information bit rate. The margin, i.e., the difference (in dB) between the received Eb/No and the threshold Eb/No, can therefore be directly controlled by varying the information rate. Thus, if the information rate Ri is halved, the link margin doubles. Likewise, if the information rate Ri is doubled the link margin decreases by half. Although the information rate Ri has been described herein to vary between three levels, e.g., high, medium and low levels, it should be understood that the information rate Ri can vary between any number of levels. For example, each user terminal 22 can be operated with a different information rate Ri specific to each user terminal 22. Or, the user terminals 22 may be assigned to groups according to their degree of advantage or disadvantage, and a limited set of information rates Ri selected to communicate with each group. A user terminal 22 group assignment may change as its link conditions change. For example, an advantaged user terminal 22 may become a disadvantaged user terminal 22 when experiencing high rain loss.

Figure 5:
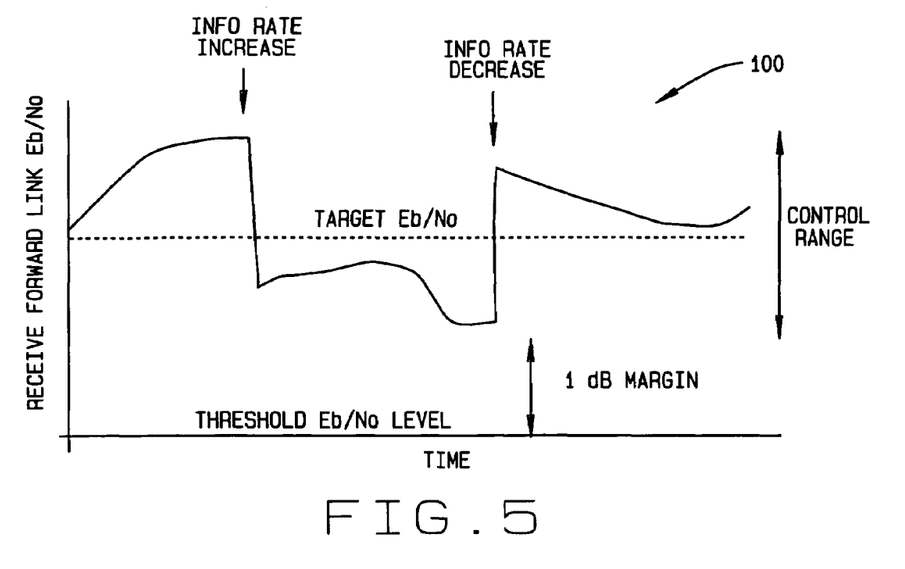
FIG. 5 is an exemplary graphical illustration of a user terminal Eb/No for the communication system shown in FIG. 3.

Referring now to FIG. 5, an exemplary graphical representation 100 of the Eb/No margin for the forward link 26, with respect to communication with any one of user terminals 22, is illustrated. In various embodiments, the controller 66 commands the transmitter 62 to increase, decrease or leave unchanged the transmit information rate Ri of each TDM signal frame 38 to maintain the forward link margin within a fixed control range. The fixed control range is predetermined to be equally above and below a forward link target Eb/No. In this manner, an active control loop can be created, as described above, which keeps the margin of the forward link 26 approximately at a specified target level as the link conditions to each user terminal 22 change. When the Eb/No of the signal received by user terminal 22 exceeds the target range shown in FIG. 5, the base station controller 66 commands an information rate Ri increase which results in a step decrease in Eb/No received by user terminal 22. The Eb/No is now closer to the target Eb/No level and is within the specified control range. Likewise, if the Eb/No of the received signal moves to the lower end of the control range, the controller 66 reacts by decreasing the information rate Ri to keep the Eb/No within the control range.

In various embodiments, a spread-spectrum modulator 70 is incorporated into the base station transmitter 62 to decouple changes in the information rate Ri from changes in the occupied signal bandwidth W. Accordingly, the communication system 10, as described herein, effectively maintains the signal bandwidth W at a constant level. As previously described, for non-spread spectrum signals, the occupied signal bandwidth is proportional to the symbol rate Rs, which is also proportional to information rate Ri. Thus, the occupied signal bandwidth W must change is proportion to information rate Ri unless spread spectrum modulation is employed. In various embodiments, the spread-spectrum modulator 70 employed by communication system 10 is direct sequence spread spectrum (DSSS) modulator. With DSSS modulation, a constant or nearly constant occupied signal bandwidth W can be maintained with varying information rate Ri by "chipping" the modulation symbols on the forward link signal 34. In various implementations, the spread-spectrum modulator 70 uses a pseudo noise (PN) code for 'chipping' the symbols. The occupied signal bandwidth W of a DSSS signal is simply equal to the chipping rate Rc. By using m chips to each symbol, the symbol rate Rs can be effectively decoupled from the occupied signal bandwidth W, as illustrated by the equation;

$$W \approx Rs * m, \quad (2)$$

wherein m is the number of chips per symbol. The controller 66 in cooperation with the spread-spectrum modulator 70 selects m such that occupied signal bandwidth W remains approximately constant as Ri is varied.

Furthermore, substituting equation (1) into equation (2) provides:

$$W \approx Ri * m / (k * (j/n)). \quad (3)$$

Equation (3) illustrates that m can be selected to keep the occupied signal bandwidth W constant as the information rate Ri is varied with any order of modulation k or code rate (j/n) As described above, the value of k (bits per symbol) and j/n (code rate) are typically set to a constant value under power limited conditions, which often occur with small user terminal antennas 30. Under power limited conditions, the values of k and j/n are usually selected to achieve the greatest power efficiency, which is achieved by selecting k and (j/n) to achieve the lowest possible threshold Eb/No. For example, in accordance with a DVB-S2 standard, the modulation (M) and coding (C) that provide the greatest power efficiency and lowest threshold Eb/No for a bit error rate (BER) of 1E−7, are k=2 and j/n=1/4. Therefore, utilizing this waveform selection, having k=2 and j/n=1/4, equation (3) becomes;

$$W \approx Ri * 2m. \quad (4)$$

Since the number of chips per symbol m must be an integer, and the occupied signal bandwidth W held constant, only discrete values of Ri can be used in equation (4). The discrete values of Ri that result from equation (4) are listed in Table 200, shown in FIG. 6, for the example of k=2 and j/n=1/4. Table 200 illustrates an exemplary information signal 34 transmitted over the forward link 26 having a coding value of k=2, a modulation rate of j/n=1/4 and an occupied signal bandwidth of 32.4 MHz corresponding to a chipping rate of Rc=32.4 Mchips/sec. Values of m that produced infinite decimal values of Ri were deleted from the table 300 to avoid variance of the occupied signal bandwidth W due to round off error. In this example, a chipping rate of exactly 32.4 Mchips/sec was used because it is 90% of a typical 36 MHz satellite transponder bandwidth. In various embodiments, the use of signal filtering techniques can allow a signal having a 3 dB bandwidth equal to 90% of the transponder 24 bandwidth to meet strict out-of-band emission requirements imposed by regulatory administrations even after nonlinear amplification through a saturated transponder 24.

Figure 6:
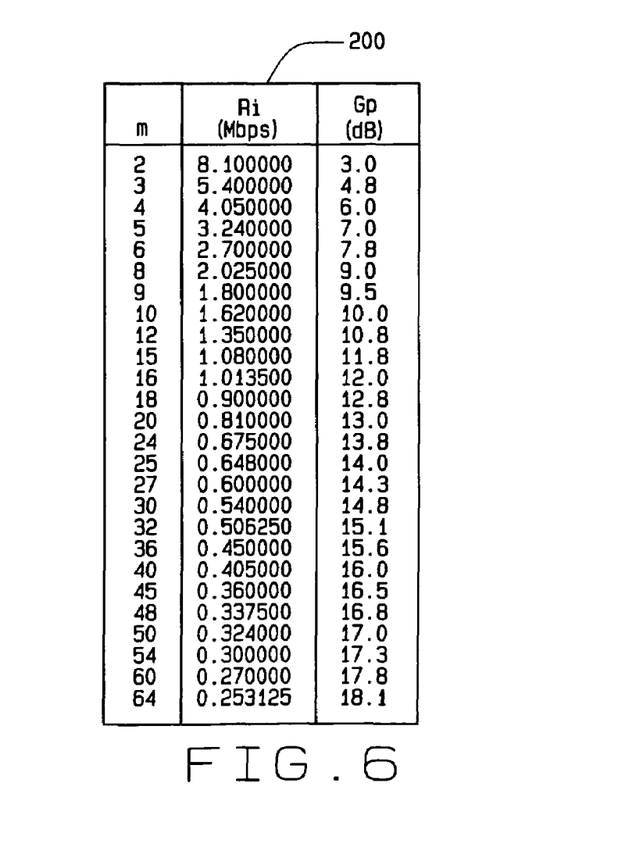
FIG. 6 is an exemplary table illustrating allowable information rate (Ri) values for an information signal transmitted over a forward link of the communication system shown in FIG. 3, having an exemplary FEC code rate, modulation order and spread spectrum 'chipping' rate.

As described throughout herein, the communication system 10 maintains the modulation order k and the code rate j/n of the TDM signal 34 at substantially constant values when operation under power limited conditions that are typical for small user terminal antennas 30. Therefore, the threshold Eb/No effectively does not change. However, to adapt to varying signal conditions a spread spectrum processing gain Gp will change with varying information rate Ri. Particularly, the processing gain Gp is equal to the number of chips/symbol m and therefore, will change as m changes. Additionally, as defined by equation (4) and shown in table 200, for a fixed signal bandwidth W, the processing gain Gp is inversely proportional to the information rate Ri. Thus, a very simple control mechanism is provided for the communication system 10, particularly the base station 14, to dynamically adjust the link margin of the forward link 26 to account for changing link conditions with the one or more user terminals 22.

For example, if the forward link 26 to a particular user terminal 22 is operating at 1.62 Mbps experienced a 0.8 dB rain fade that decreased the link margin to 0.8 dB below the target Eb/No value, Table 200 exemplarily illustrates that the base station controller 66 would respond by changing m from 10 to 12 to increase the processing gain Gp by 0.8 dB. Therefore, the information rate Ri would be decreased from 1.62 Mbps to 1.35 Mbps to compensate for the lost margin cause by the rain fade. As illustrated in table 200, the dynamic range of processing gain Gp is approximately 15 dB for this example. However, even lower information rates Ri and higher dynamic ranges of processing gain Gp are possible by using more chips per symbol m. For example, the range of information rates Ri shown in table 200 is sufficient for user terminal antennas 30 having aperture diameters between approximately 0.2 and 0.6 meters at the Ku-band and rain loss variation of 6 dB.

Although the maximum information rate Ri illustrated in table 200 corresponds to a chipping rate of m=2 chips/bit, the communication system 10 can easily utilize a chipping rate of m=1. However, at a chipping rate of m=1 the TDM signal 34 waveform would no longer be considered to be spread spectrum. That is, at a chipping rate of m=1, the occupied signal bandwidth W will be approximately equal to the symbol rate Rs. Thus, if higher information rates Ri than the information rate Ri corresponding to m=2 are desired, adaptive coding and modulation (ACM) can be used to keep the symbol rate Rs constant as the information rate Ri changes. More particularly, in accordance with various embodiments, the communication system 10 can seamlessly transition from utilizing adaptive information rate (AIR), as described above, to adaptive coding and modulation (ACM) at higher information rates Ri. That is, at higher information rates Ri than those corresponding to m=2 are desired, the communication system 10 can transition from utilizing AIR to ACM while maintaining the occupied signal bandwidth W effectively constant. This is accomplished by keeping the AIR chipping rate m equal to the ACM symbol rate Rs. Stated yet another way, once the information rate Ri is increased to some maximum value in which m=1, the occupied signal bandwidth W must increase as the information rate Ri is increased, if k and (j/n) remain constant. At this point the forward communication link 26 becomes spectrum limited rather than power limited. The only way to maintain a fixed occupied signal bandwidth W as the information rate Ri increases is to vary k and/or j/n, which is characteristic of the ACM method.

Transitioning to ACM may be desirable when the communication system 10 includes a plurality of user terminals 22 having large antenna 30 aperture sizes used on large user terminals 22 at fixed locations that can support high information rates Ri. For example, transitioning to ACM may be desirable when the aperture size of the user terminal antennas 30 are VSAT-sized and larger, e.g., having a diameter greater than 0.8 m at the Ku-band. When the user terminals 22 are comprised of a very wide range of antenna sizes 30 spanning the range over which both AIR and ACM provide the most efficient solution, then the AIR method and apparatus allow seamless transition to ACM Thus, the flexibility of the communication system 10 to seamlessly transition from AIR to ACM provides a very wide dynamic range of user terminal antenna sizes and conditions.

Figure 7:
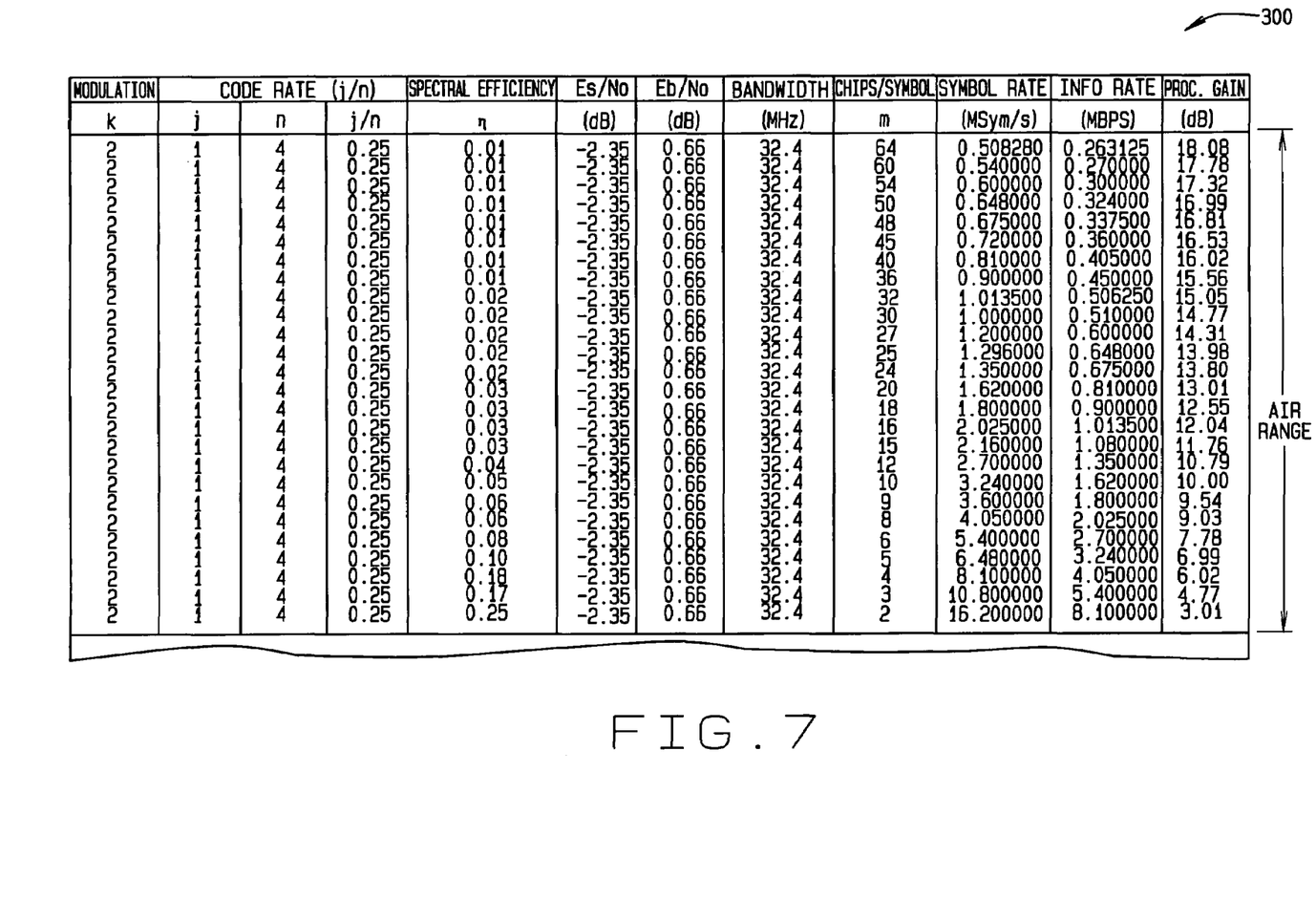
FIG. 7 is an exemplary table illustrating the seamless transition of the operation of the satellite communication system, shown in FIG. 3, from adaptive information rate (AIR) method to the adaptive coding and modulation (ACM) method, in accordance with various embodiments of the present disclosure.

For example, FIG. 7 illustrates a table 300 that exemplarily shows the seamless transition of the operation of the communication system 10 from AIR having coding and modulation fixed at k=2 and (j/n)=0.25, to operation using ACM with varying coding j/n and modulation k to extend the dynamic range of the information rate Ri beyond 8.10 Mbps. A constant signal bandwidth of 32.4 MHz is utilized to obtain the values shown in table 300. As exemplarily illustrated in table 300, the range of information rates Ri at which AIR is utilized is between 0.25 Mbps and 8.1 Mbps, with the chipping rate m varying between m=64 and m=2. The code rate j/n and the modulation value k are held constant over the AIR range. For information rates Ri higher than 8.1 Mbps, the communication system 10 seamlessly transitions to ACM where the symbol rate Rs is held constant and the information rate Ri changes by selecting different settings for the coding rate j/n and modulation order k.

As shown in table 300, the information rate Ri step size increases as the chips per bit m decreases. The Ri step size is particularly large when the chipping rate m transitions between m=2 and m=1. As shown in table 300, a large Ri step size between m=2 and m=1 causes approximately an 8.1 Mbps change in information rate Ri. Such a large Ri step size can create excess margin, e.g., up to 3 dB, and hence a lower operation efficiency at information rates Ri where the chipping rate m approaches m=1. Therefore, in accordance with various embodiments of the present disclosure, the information rate Ri step size is decreased by slightly changing the coding rate j/n and/or the modulation value k. More particularly, when utilizing the AIR method, as the chipping rate m becomes small and approaches m=1, the coding rate j/n and/or the modulation value k can be slightly varied to enable smaller Ri step sizes, i.e., additional information rate Ri values. Generally, the best results are obtained when j/n is varied slightly over a range of values that result in little or no change in the threshold Eb/No.

Figure 8:
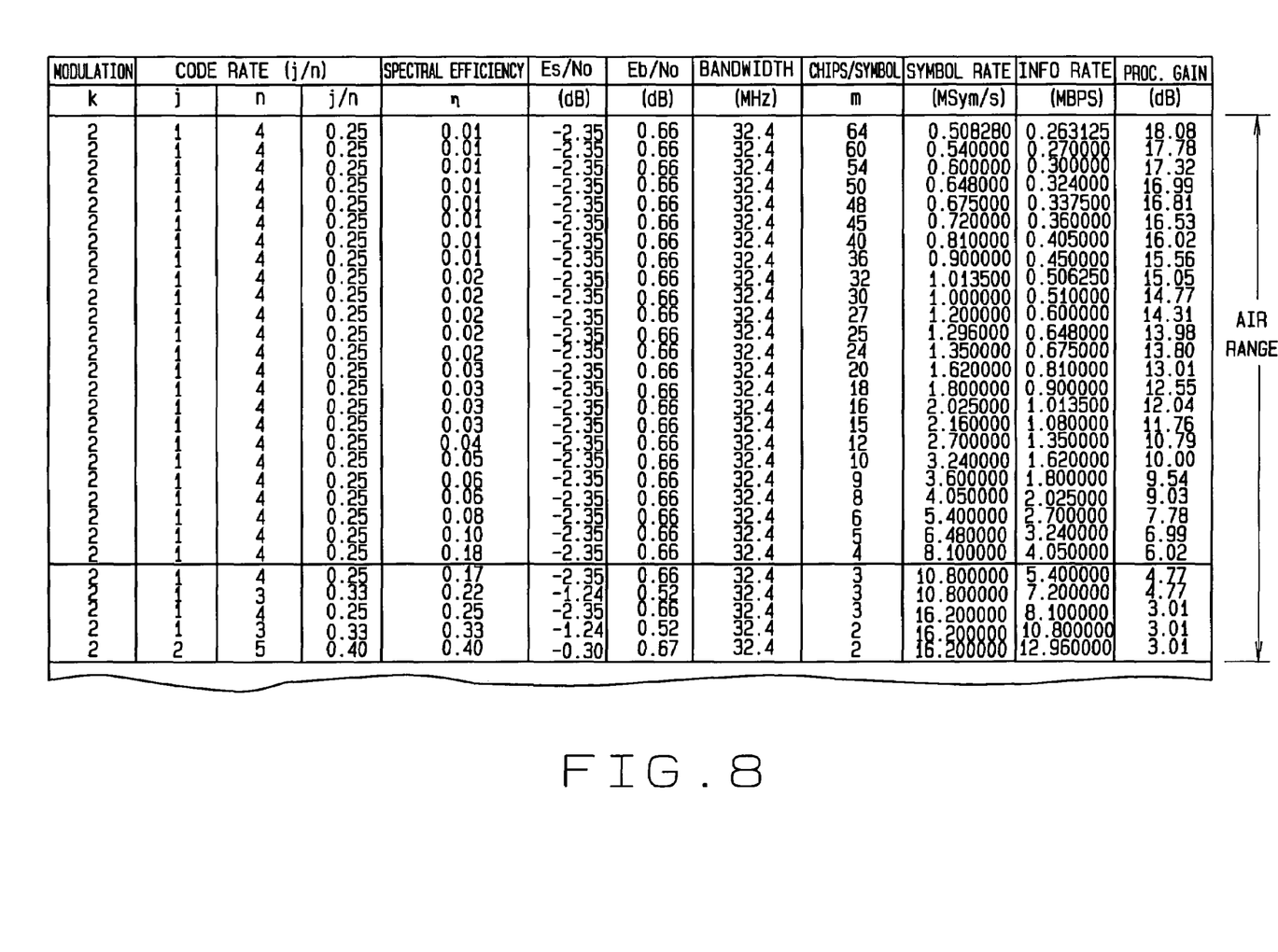
FIG. 8 is an exemplary table illustrating additional information rate Ri steps that can be added during the seamless transition of the operation of the satellite communication system, shown in FIG. 3, from the AIR method to the ACM method, in accordance with various embodiments of the present disclosure.

In various implementations, to generate smaller information rate Ri step sizes, code rate j/n is modified. For example, in reference to table 300, to add more information rate Ri steps, i.e., reduce the Ri step size, between m=3 and m=2, a second code rate of j/n=1/3 could be utilized, as illustrated in table 400 of FIG. 8. Similarly, where even larger Ri step sizes occur, e.g., between m=2 and m=1, additional Ri steps could be added by utilizing a second and a third code rate of j/n=1/3 and j/n=2/5, as also illustrated in table 400. In accordance with the exemplary embodiment shown in table 400, varying the code rate j/n between j/n=1/4, j/n=1/3 and j/n=2/5 causes very little change in the threshold Eb/No. This is because the threshold Eb/No versus modulation k curve will be nearly flat in this region, as illustrated in FIG. 1. Thus, in the example of FIG. 1, there is almost no performance penalty for not using the most power efficient coding, i.e., a code rate of j/n=1/3 in this example, because slight variations in the code rate j/n produce negligible changes in threshold Eb/No.

Although the communication system 10 has been described and illustrated herein as operating at a Ku frequency band, it should be understood that the communication system 10 can be implemented using any frequency band and remain within the scope of the disclosure. For example, implementation of the communication system 10 can be very effective at higher frequency bands such as the Ka-band and the W-band, where signal loss conditions can cause large difference between user terminals 22 operating in heavy rain and user terminals operating in clear sky conditions. Furthermore, loss conditions, as used herein, as one factor that differentiates advantages user terminals 22 from disadvantaged user terminals 22, can include a plurality of environmental and operational factor that impede or reduce the strength of the signals 34A when received at the user terminals 22. For example, loss conditions can include rain fade, multi-path fading, scintillation and various other signal blockage losses such as communication path obstruction by trees, foliage, wires, buildings, birds, etc. Another factor that can cause large variations when the communication system 10 utilizes satellite transponders 28, is the variation in EIRP over the coverage footprint 35. EIRP at edge of transponder coverage footprint 35 can sometimes be several dB below the satellite EIRP at center of coverage, which can make a user terminal 22 operating at center of coverage more advantaged relative a user terminal 22 at edge of coverage.

Therefore, in various embodiments, the present system and method provides an apparatus and method for achieving highly efficient unicast and/or multicast forward link communications to a wide range of user terminal antenna sizes and loss conditions. The present disclosure utilizes adaptive information rate (AIR) over a single carrier to dynamically vary the information rate Ri to each user terminal to rapidly adjust to changing link conditions. Spread spectrum modulation is employed to maintain a constant signal bandwidth while the information rate Ri changes to adapt to the unique conditions of each communication link. The transmit information rate Ri is substantially instantaneously set or adjusted at the boundaries of each successive signal frame that comprises the TDM signal 34. The transmit information rate Ri is set or adjusted by the base station transmitter by measuring the Eb/No of the receive signal at the user terminal, and then feeding back the measurement to the base station on the return link. The base station then adjusts the information rate to keep the receive Eb/No at a fixed margin above the threshold Eb/No. Additionally, implementation of the communication system 10, as described above, allows a signal amplifier of the relay and distribution device 18, e.g., the satellite 18, to be operated at or near a maximum saturation output power of the amplifier and at a constant amplitude, thereby achieving maximum power efficiency.

While various embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A satellite communications method for communicating information from a base station, via a satellite, to one or more user terminals via a single channel of a forward link, said method comprising:

providing a satellite having a satellite transponder;

determining a separate information rate for information to be transmitted from the base station to each of the user terminals, using the satellite, such that a predetermined amount of margin above a threshold energy per bit to power spectral density noise ratio (Eb/No) is provided in the forward link;

formatting data received at the base station into a continuous time division multiplexed (TDM) data stream including a plurality of data frames to be transmitted to the user terminals via the forward link, each data frame formatted to have the determined information rate of the respective user terminal that is to receive the data frame;

transmitting the TDM data stream on a single carrier of the forward link, using the satellite;

continuously and dynamically adjusting the information rate of subsequent data frames transmitted on the forward link from the base station, via the satellite, for each user terminal to maintain successful communication and maintain the predetermined amount of margin as operating conditions of each user terminal change; and maintaining an approximately constant occupied signal bandwidth of the TDM data stream using spread spectrum modulation as the information rate is changed from data frame to data frame.

2. The method of claim 1, wherein formatting data received comprises formatting the data frames with a substantially fixed forward error correction coding rate, and a substantially fixed modulation order that achieves the minimum threshold Eb/No and a constant direct sequence spread spectrum chipping rate, while the information rate is continuously and dynamically adjusted from frame to frame.

3. The method of claim 2, wherein formatting data received comprises:

applying the forward error correction coding and modulation order that provides the minimum threshold Eb/No to all data frames for a selected group of the most disadvantaged user terminals to adapt to each disadvantaged user terminal and its link condition, and changing the forward error correction coding and modulation to dynamically adjust the information rate of data frames multiplexed into the same forward link TDM data stream for a selected group of more advantaged user terminals to adapt to each more advantaged user terminal and its link condition.

4. The method of claim 1, wherein continuously and dynamically adjusting the information rate comprises continuously and dynamically adjusting a processing gain of the spread spectrum modulation.

5. The method of claim 1, wherein the spread spectrum modulation comprises direct sequence spread spectrum having a substantially constant chipping rate.

6. The method of claim 5, wherein the method further comprises slightly varying a forward error correction code rate of the TDM signal to reduce a step size between allowable information rate values that produce the approximate constant occupied signal bandwidth signal when the direct sequence spread spectrum modulation uses a small number of chips per information bit.

7. The method of claim 1, wherein determining a separate information rate for information to be transmitted to each user terminal comprises:
continuously measuring the Eb/No of the signal received at each user terminal and communicating the measured Eb/No to the base station; and
calculating the margin on the forward link during transmission of the data frames to each respective user terminal by subtracting the threshold Eb/No from each measured Eb/No.

8. The method of claim 1, wherein transmitting the TDM data stream comprises transmitting information to a selected group of the user terminals using the determined information rate for the most disadvantaged user terminal of the selected group that is to receive the information.

9. The method of claim 1, wherein the method further comprises operating a signal amplifier of the satellite transponder approximately at a maximum saturation output power of the signal amplifier.

10. The method of claim 1, wherein the method further comprises operating a power amplifier of the base station approximately at a maximum saturation output power of the power amplifier.

11. The method of claim 1, wherein each data frame comprises a synchronization word, all synchronization words the same and transmitted at an information rate adapted to allow all user terminals to maintain synchronization with the forward link TDM data stream.

12. The method of claim 1, wherein the method further comprises maintaining an approximately constant occupied signal bandwidth of the TDM data stream as the information rate is changed from data frame to data frame by changing a forward error correction coding rate and a signal modulation of the TDM signal stream without the use of spread spectrum modulation.

13. A satellite communications method for communicating information from a base station to one or more user terminals via a single channel of a forward link via a transponded satellite, the one or more user terminals subject to time varying losses and performance differences that affect the quality of the forward link, said method comprising:
determining a separate information rate for information to be transmitted from the base station via the forward link, using the transponded satellite, to each of the user terminals, each information rate determined to allow successful communication with the respective user terminal and provide a predetermined amount of margin above a threshold energy-to-noise ratio power spectral density (Eb/No) in the forward link;
formatting data received at the base station into a continuous time division multiplexed (TDM) data stream including a plurality of data frames to be transmitted to the user terminals via the forward link using the transponded satellite, each data frame formatted to have the determined information rate of the respective user terminal that is to receive the data frame;
transmitting the TDM data stream using a single carrier of the forward link, via the transponded satellite link;
continuously and dynamically adjusting the information rate at the boundaries of subsequent data frames being transmitted via the forward link on the single channel for each user terminal, to adapt to the time varying losses and user terminal performance differences and maintain the predetermined amount of margin for each user terminal as the operating conditions of each user terminal change; and
maintaining an approximately constant occupied signal bandwidth of the TDM data stream using spread spectrum modulation as the information rate is changed from data frame to data frame.

14. The method of claim 13, wherein the spread spectrum modulation comprises direct sequence spread spectrum having a substantially constant chipping rate.

15. The method of claim 13, wherein transmitting the TDM data stream comprises maintaining a forward error correction coding rate and a signal modulation of the TDM data stream approximately constant while the information rate varies.

16. The method of claim 13, wherein transmitting the TDM data stream comprises transmitting specific data frames to more than one of the user terminals using the determined information rate for the most disadvantaged user terminal that is to receive the data frames.

17. The method of claim 13, wherein the method further comprises operating a signal amplifier of the transponded satellite approximately at a maximum saturation output power of the signal amplifier.

18. The method of claim 13, wherein the method further comprises seamlessly transitioning from varying the information rate to maintain the approximately constant occupied signal bandwidth, to changing a forward error correction coding rate and a signal modulation of the TDM signal stream to maintain the approximately constant occupied signal bandwidth, when the information rate has been varied such that the TOM data stream comprises a non-spread spectrum TOM data stream.

19. A satellite based communication system comprising:
a base station configured to:
communicate with one or more user terminals via single channel of a transponded satellite forward link;
determine a separate information rate for information to be transmitted from the base station via the transponded satellite forward link to each of the user terminals, each information rate determined to allow successful communication with the respective user terminal and provide a predetermined amount of margin above a threshold energy per bit to noise power spectral density ratio (Eb/No) in the forward link;
format data received at the base station into a continuous time division multiplexed (TDM) data stream including a plurality of data frames to be transmitted to the user terminals via the transponded satellite forward link, each data frame formatted to have the determined information rate of the respective user terminal that is to receive the data frame;
transmit the TDM data stream using a single carrier forming the single channel of the forward link;
continuously and dynamically adjust the information rate of subsequent data frames of the TDM data stream on the single channel of the transponded satellite forward link, for each user terminal to maintain successful communication and maintain the predetermined amount of margin as the operating conditions of each user terminal change; and maintain an approximately constant occupied signal bandwidth of the TDM data stream using spread spectrum modulation as the information rate is changed from data frame to data frame.

20. The system of claim 19, wherein the spread spectrum modulation comprises direct sequence spread spectrum having a substantially constant 'chipping' rate.

21. The system of claim 19, wherein to continuously and dynamically adjust the information rate, the base station is further adapted to continuously and dynamically adjust a processing gain of the spread spectrum modulation.

22. The system of claim 19, wherein to transmit the TDM data stream, the base station is further adapted to maintain a forward error correction coding rate and a signal modulation of the TDM data stream approximately constant while the information varies.

23. The system of claim 19, wherein to determine a separate information rate for information to be transmitted to each user terminal, the base station is further adapted to:

receive from each user terminal measurements for the Eb/No of the signal received at each user terminal; and calculate the margin on the transponded satellite forward link during transmission of the data frames to each respective user terminal by subtracting the threshold Eb/No from each measured Eb/No.

24. The system of claim 19, wherein to transmit the TDM data stream, the base station is further adapted to transmit specific data frames to more than one of the user terminals using the determined information rate for the most disadvantaged user terminal that is to receive the data frames.

25. The system of claim 19, wherein the satellite transponder includes a signal amplifier that is operated approximately at a maximum saturation output power as the TDM data stream is relayed and distributed to the user terminals via the transponder satellite.

26. The system of claim 19, wherein the base station is further configured to seamlessly transition from varying the information rate to maintain the approximately constant occupied signal bandwidth, to changing a forward error correction coding rate and a signal modulation of the TDM signal stream to maintain the approximately constant occupied signal bandwidth, when the information rate has been varied such that the TDM data stream comprises a non-spread spectrum TDM data stream.

* * * * *

UNITED STATES PATENT AND TRADEMARK OFFICE
CERTIFICATE OF CORRECTION

PATENT NO. : 7,643,441 B2  
APPLICATION NO. : 11/378563  
DATED : January 5, 2010  
INVENTOR(S) : de La Chapelle et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Sixteenth Day of November, 2010

David J. Kappos  
*Director of the United States Patent and Trademark Office*